(12) United States Patent
Holmgren (10) Patent No.: US 6,904,431 B2
(45) Date of Patent: Jun. 7, 2005

(54) ALGORITHM FOR DYNAMIC SELECTION OF DATA LOCKING GRANULARITY

(75) Inventor: Steve Holmgren, Santa Barbara, CA (US)

(73) Assignee: Openwave Systems Inc., Redwood City, CA (US)

(*) Notice: Subject to any disclaimer, the term of this patent is extended or adjusted under 35 U.S.C. 154(b) by 537 days.

(21) Appl. No.: 10/058,164

(22) Filed: Jan. 25, 2002

(65) Prior Publication Data

US 2003/0144980 A1 Jul. 31, 2003

(51) Int. Cl.7 .............................................. G06F 17/30
(52) U.S. Cl. .......................... 707/8; 707/200; 707/201; 711/113
(58) Field of Search ................................ 707/1, 2, 201, 707/8, 9, 206, 200; 711/133, 155; 714/32, 48; 719/318

(56) References Cited

U.S. PATENT DOCUMENTS

| | | | |
|---|---|---|---|
| 4,791,554 A | * 12/1988 | Hirota et al. ................... 707/8 |
| 6,336,164 B1 | * 1/2002 | Gerdt et al. ................. 711/113 |
| 6,647,517 B1 | * 11/2003 | Dickey et al. ................. 714/48 |
| 6,665,818 B1 | * 12/2003 | Dickey et al. ................. 714/32 |
| 6,785,893 B2 | * 8/2004 | Morris et al. ................ 719/318 |
| 2004/0054643 A1 | * 3/2004 | Vemuri et al. .................. 707/1 |

OTHER PUBLICATIONS

Rick Anderson, "RMU Show Statistic DBA Handbook", Dec. 15, 1998, Oracle Corporation, Second Edition, pp. 119–121.*
"Spotlight on Sybase ASE, Visual Root–Cause Diagnostics and Resolution for Sybase", 2003, Quest Software, pp. 1–2.*
Szotin, "Lock Manager for .Net", Aug. 12, 2003, www.thecodeproject.com, pp. 1–2.*
Ed Woods, "OMEGAMONNI for DB2 Lock History Considerations", Aug. 03, 2004, www.candle.com, pp. 1–4.*

* cited by examiner

Primary Examiner—Charles Rones
Assistant Examiner—Jacob F. Betit
(74) Attorney, Agent, or Firm—Blakely, Sokoloff, Taylor & Zafman LLP (57) ABSTRACT

A method and apparatus for improving database concurrency are described. Upon receiving a request to access data, a data locality within a database may be determined utilizing unique data keys. An access to the data may be provided while locking part of the database based on a data locking level determined based on deadlock history corresponding to the data locality.

51 Claims, 6 Drawing Sheets

ALGORITHM FOR DYNAMIC SELECTION OF DATA LOCKING GRANULARITY

FIELD OF THE INVENTION

The present invention pertains to database technology. More particularly, the present invention relates to improving database concurrency while minimizing a possibility of a deadlock.

BACKGROUND OF THE INVENTION

Present technology allows multiple users to access one set of data via a network. Capability to access simultaneously large bodies of message data improves the efficiency of this technological development.

In order to maintain data integrity, no two users may modify data, for example message data in an email system, at the same time. The present technology utilizes locks to serialize data access to one user at a time. To promote the most concurrent access to message data, locks are placed with the finest granularity practical. The difficulty with placing extremely fine grained locks, for example locks on every word of a message data, is the need for single processing entities to obtain and hold multiple locks during the processing of a message. If the granularity of locks within a message system is too fine grained, this leads to deadlock situations.

A deadlock is a case where one thread of processing holds a lock and, at the same time, requires a lock held by another thread. In addition to holding the lock that the first thread requires, the second thread, in turn, requires the lock that the first thread holds. Without external intervention, this is an unresolvable situation where the processing of neither thread can progress. In addition, deadlock detection and external intervention slows message processing considerably, thus making the deadlock detection process inefficient.

A goal of the idealized message processing then is to minimize deadlock conditions, while allowing many threads of processing to access message data or message data infrastructure at the same time, thus improving data concurrency.

SUMMARY OF THE INVENTION

A method and apparatus for improving database concurrency are described. The method may comprise receiving a request to access data, determining a data locality within a database utilizing unique data keys, determining a data locking level based on a deadlock history corresponding to the data locality, and providing access to the data while locking part of the database based on the data locking level.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An algorithm for improving database concurrency is described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

Exemplary Architecture

Figure 1:
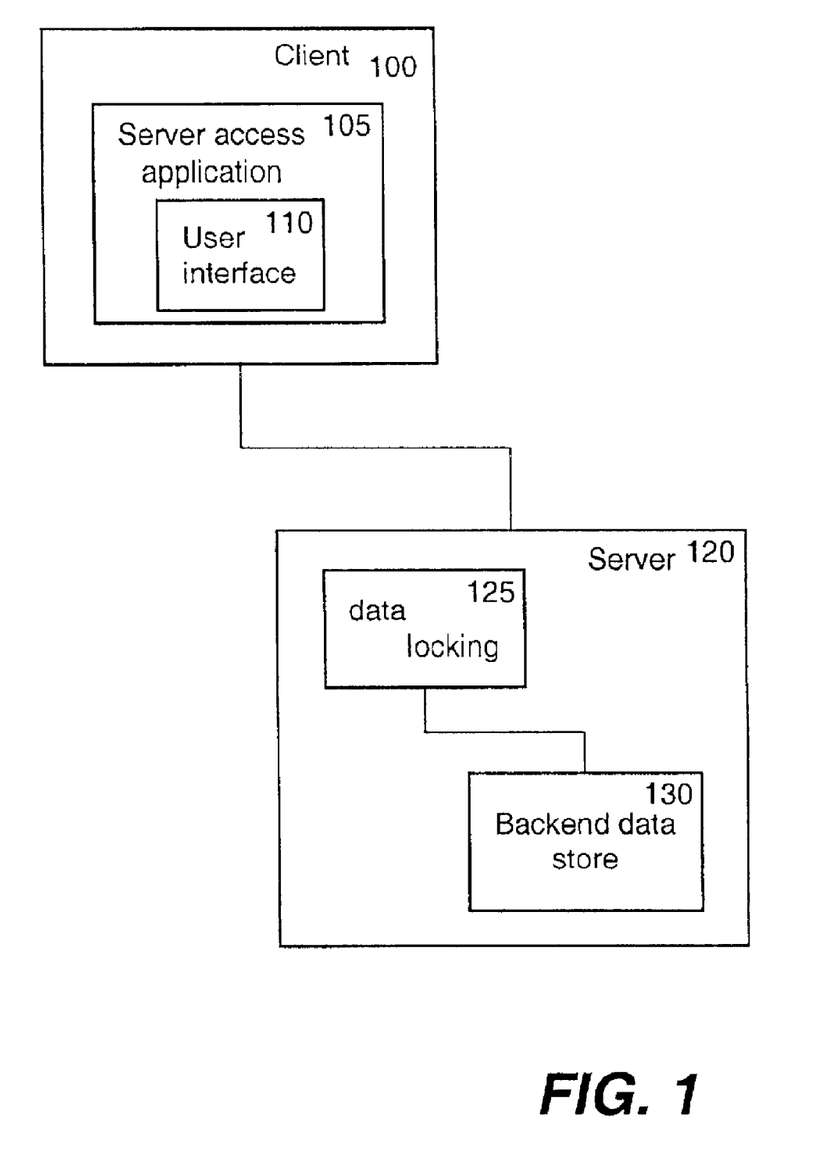
FIG. 1 illustrates an exemplary network architecture in which an embodiment of the present invention may be implemented.
Figure 2:
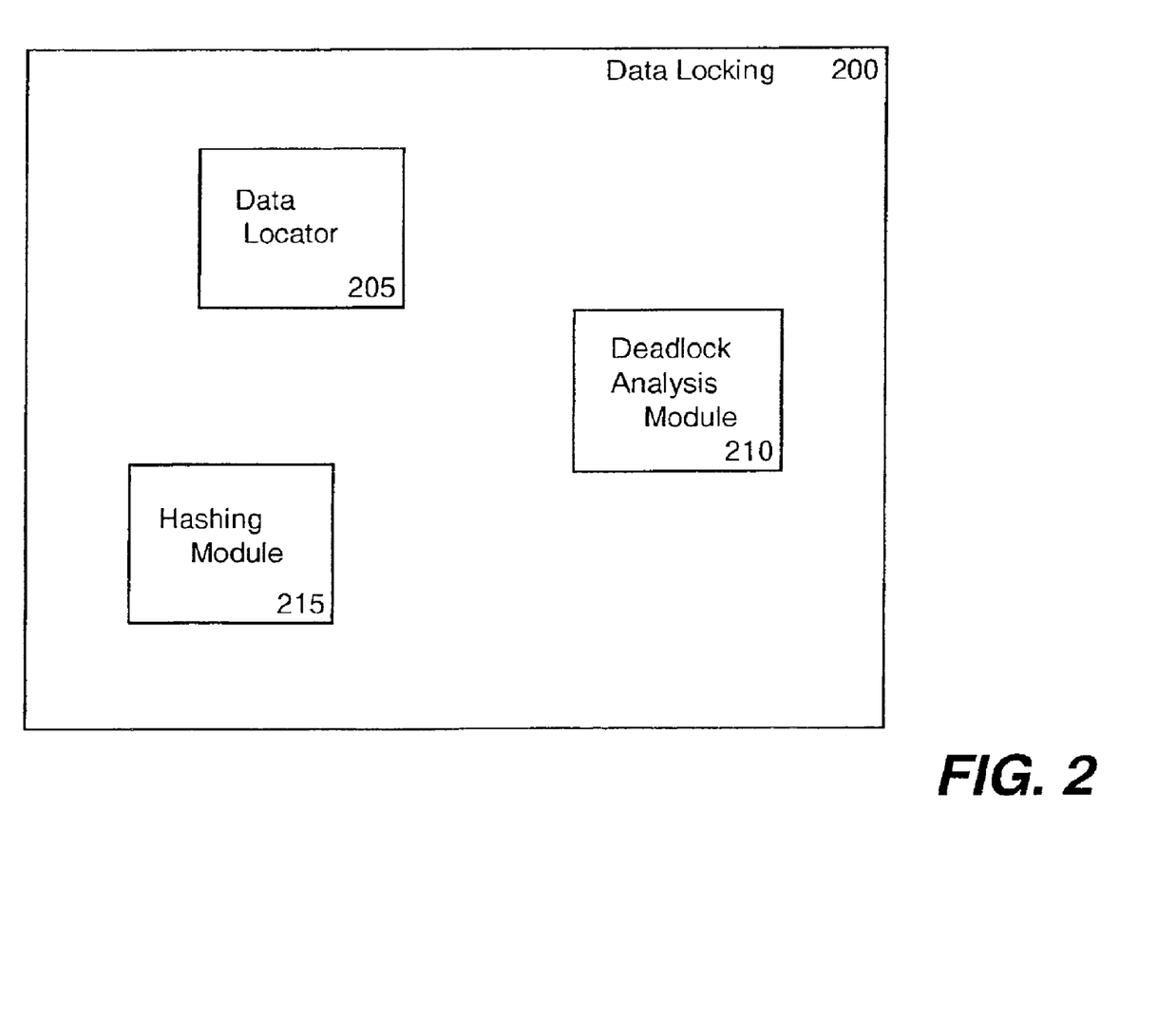
FIG. 2 illustrates components of a data locking module according to one embodiment of the present invention.

FIG. 1 illustrates an architecture in which a method and apparatus of the present invention may be implemented according to one embodiment of the invention. A user may access a server access application 105 that may run on a client machine 100. The server access application 105, e.g. an email client, may provide the user with access to content located on a server 120, which the user may specify via a user interface 110. The server 120 may contain a backend data store 130 comprising data that the user may wish to obtain access to. The backend data store 130 may contain user's data, e.g. email messages, 310 database and deadlock history 315 database illustrated in FIG. 3. The server 120 may also contain a data locking module 125. The components of the data locking module are illustrated in FIG. 2. In the illustrated embodiment the data locking module 200 contains a data locator 205, a deadlock analysis module 210 and a hashing module 215. The functions of the data locking module 200 and its components will be described in detail in the following description.

Figure 6:
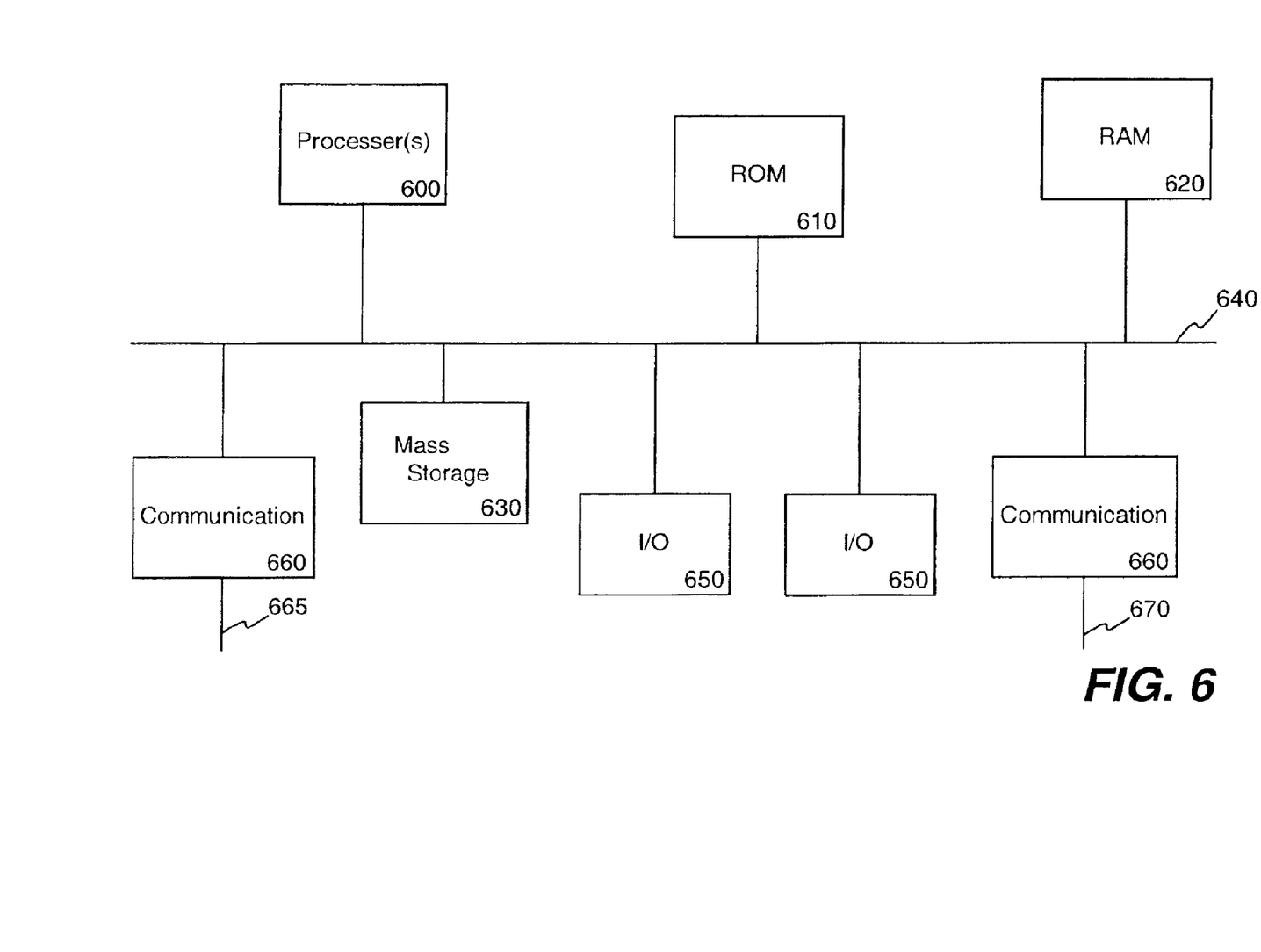
FIG. 6 illustrates a processing system according to one embodiment of the present invention.

The physical processing systems which embody the server 120 and the client 100 may include processing systems such as conventional personal computers (PCs) and/or server-class computer systems according to one embodiment of the invention. FIG. 6 illustrates an example of such a processing system at a high level. The processing system of FIG. 6 may include one or more processors 600, read-only memory (ROM) 610, random access memory (RAM) 620, and a mass storage device 630 coupled to each other on a bus system 640. The bus system 640 may include one or more buses connected to each other through various bridges, controllers and/or adapters, which are well known in the art. For example, the bus system 640 may include a 'system bus', which may be connected through an adapter to one or more expansion busses, such as a peripheral component interconnect (PCI) bus or an extended industry standard architecture (EISA) bus. Also coupled to the bus system 640 may be the mass storage device 630, one or more input/output (I/O) devices 650 and one or more data communication devices 660 to communicate with remote processing systems via one or more communication links 665 and 670, respectively. The I/O devices 550 may include, for example, any one or more of a display device, a keyboard, a pointing device (e.g., mouse, touchpad, trackball), an audio speaker.

The processor(s) 600 may include one or more conventional general-purpose or special-purpose programmable microprocessors, digital signal processors (DSPs), application specific integrated circuits (ASICs), or programmable logic devices (PLD), or a combination of such devices. The mass storage device 630 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 660 each may be any devices suitable for enabling the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, or the like.

Methodology

Figure 5:
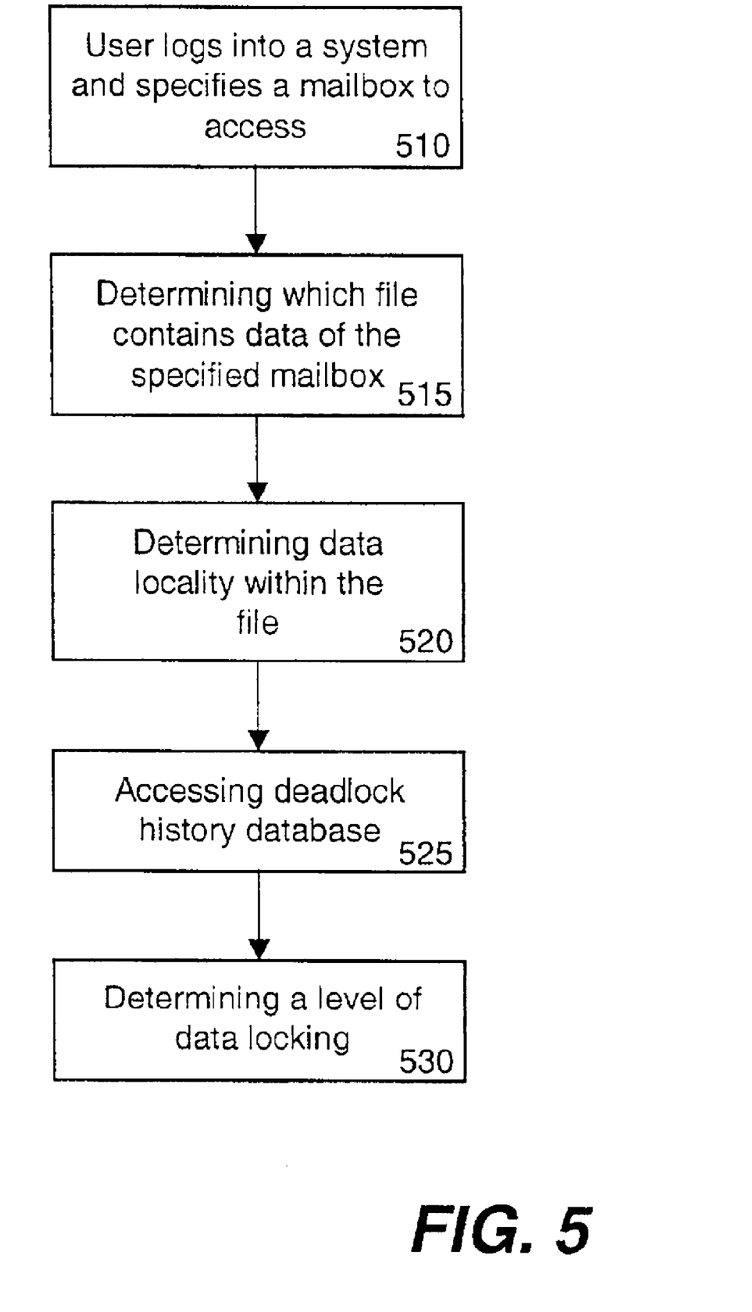
FIG. 5 is a flow diagram showing a process of determining a data locking level within a database according to one embodiment of the present invention.

With these concepts in mind an embodiment of the present invention can be further explored with reference to FIG. 5. FIG. 5 shows a process of dynamically determining a data locking level. At 510 a user may log-in into an email system via the server access application 105 that may be executed on the client machine 100. The server access application 105 may be, for example, a Microsoft Outlook email server provided by Microsoft Corporation of Redmond, Washington or Eudora email server provided by Qualcomm Inc. of San Diego, Calif. The server access application 105 provides the user with the user interface 110 to facilitate a user-friendly access to the server 120, which in one embodiment is a mail server. In one embodiment, the server access application 105 prompts the user via the user interface 110 to enter his/her user name and password in order to log-in into an email system located on the server 120. Upon the user logging into the system, the identification data is transmitted to the server 120. Upon receiving the identification data the server 120 verifies the user's authenticity, and if the identification is confirmed, the user is provided with access to the email system located on the mail server. The techniques for verifying the user's identity are well known in the art and do not require any further explanation.

At 510 after obtaining access to the email system the user may specify a mailbox that he/she would like to access. In one embodiment the user may have a number of different mailboxes. For example, the user may have an inbox mailbox that may contain the user's new and already read relevant email messages. The user may also have a junk mailbox that may contain spam email that may be filtered according to some predetermined rules. The user may also have a trash mailbox containing messages that the user previously deleted. In one embodiment if the user does not specify which mailbox to access, the user is provided with default mailbox that may be the inbox mailbox.

At 515 of FIG. 5 the data locator 205 of the data locking module 200 illustrated in FIG. 2 determines the location of the user-specified data, which may include a particular mailbox, an email message within a particular mailbox, or a number of email messages within a particular mailbox. In one embodiment every user of the email system is assigned a unique user identifying key. The unique user identifying key may be a unique text string corresponding to a user name, a user password, or combination of both. In one embodiment the unique user identifying key is the user's email address. It will be appreciated that there may be other techniques for developing and assigning a unique user identifying key to every user of the email system.

Figure 3:
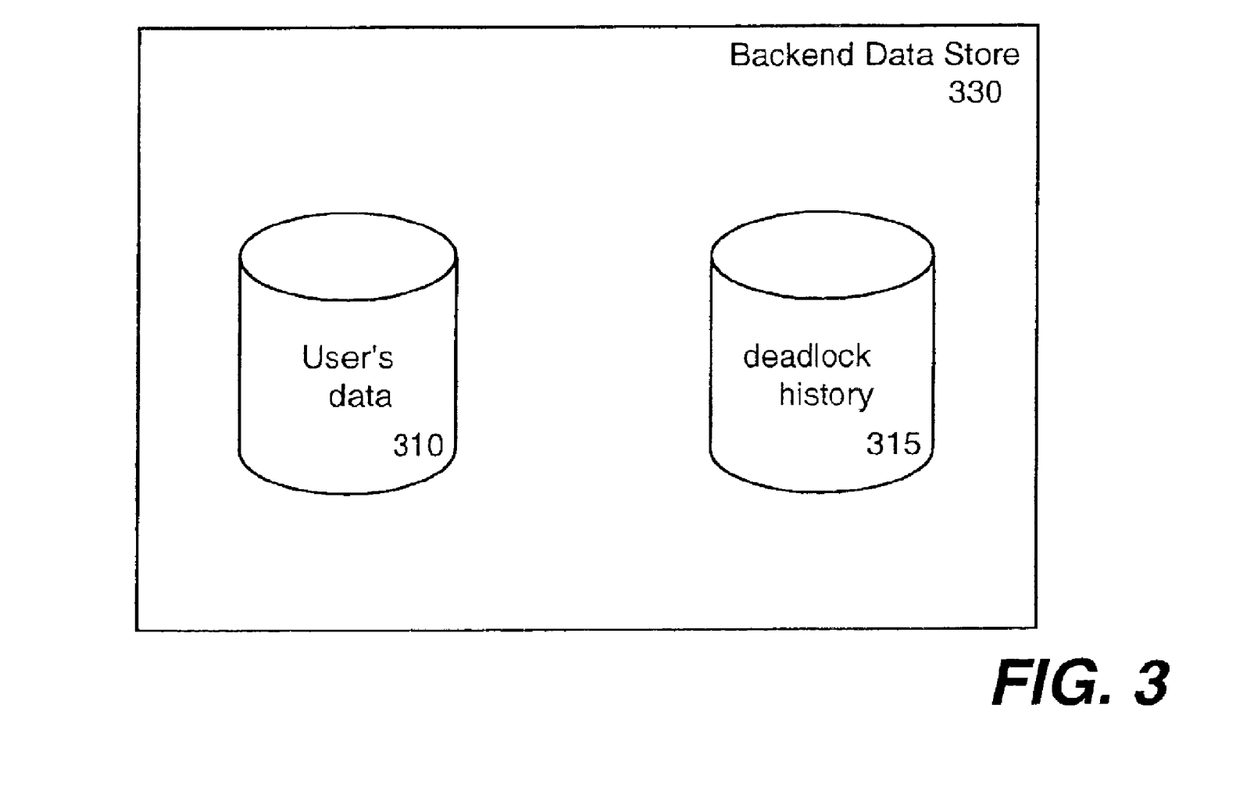
FIG. 3 illustrates components of a backend data store layer according to one embodiment of the present invention.
Figure 4:
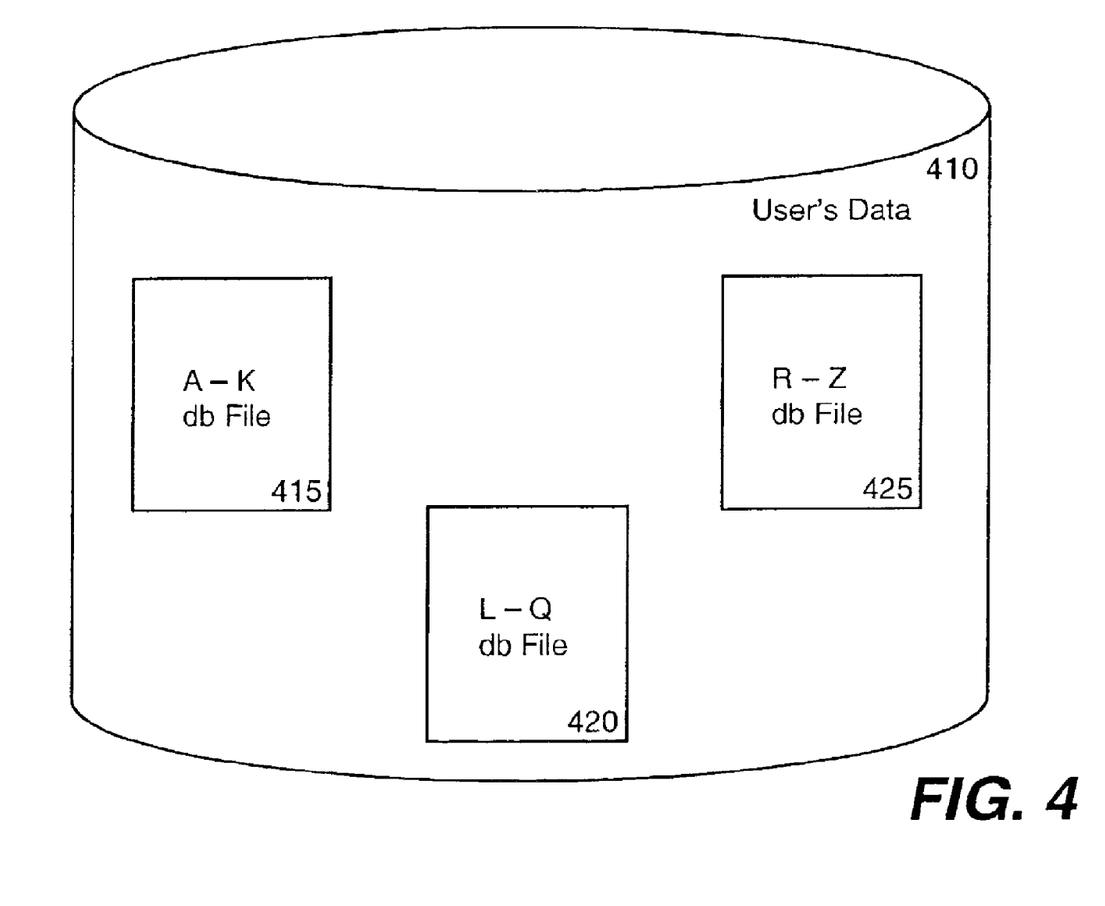
FIG. 4 illustrates components of a user's data database according to one embodiment of the present invention.

In one embodiment of the present invention the backend data store 330 of FIG. 3 contains a number of database files located in the user's data 310 database, that may be accessed utilizing unique user identifying keys. In one embodiment hashing may be used to determine a database file corresponding to the user requesting an access to his/her email data. Each database file may contain data corresponding to a number of users according to some predetermined data distribution rules. For example, the data may be distributed between the database files based on a first letter of a user's name. One example of such a data distribution is shown in FIG. 4, where a database file 415 contains data of users whose last name starts with letters 'a' through 'k', a database file 420 contains data of users whose last name starts with letters 'l' through 'q', and a database file 425 contains data of users whose last name starts with letters 'r' through 'z'.

Upon determining a database file which contains data corresponding to the user, the data locator 205 determines a location of the requested data within the file, i.e. data locality. In one embodiment, the data locator 205 after locating the data within the database file that pertains to the user, locates the user-specified mailbox or the user-specified email message within the user-specified mailbox. In one embodiment every mailbox and every email message within every mailbox are assigned a unique identification keys that may be utilized to determine the location of the requested data within a data file. In one embodiment hashing algorithms may be utilized along with the unique identification keys to determine the requested data locality.

Upon locating the requested data within a data file containing data corresponding to the user, the deadlock analysis module 210 at 530 of FIG. 5, in order to ensure data consistency and data concurrency in the database, determines a level of data locking to be applied by accessing a deadlock history database 315. In one embodiment the deadlock history database 315 contains information about previous deadlocks occurred during a predetermined time interval that involved data located within a single database file. The deadlock history database 315 may also contain a number of successful message data requests without a deadlock from the database file during a predetermined time interval. The entries of the deadlock history database 315 corresponds to each data locality. In one embodiment the data locality is defined as a database object within a database file and the deadlock history information is kept for every database object within a database file. In another embodiment the data locality is defined as a database page and the deadlock history information is kept for every database page within a database file. In yet another embodiment the data locality is defined as a database row and the deadlock history information is kept for every database row within a database file. It will be appreciated that neither the data locality definition nor the deadlock history database design is limited to the examples presented above and may be defined and designed to accommodate the system's needs, data and size in order to reduce data overhead occurring due to maintenance of deadlock information in the database.

In one embodiment of the present invention, hashing is utilized to determine the locality of the user-requested data within a database file. The hashing module 215 may determine the locality of data by utilizing a hashing algorithm and unique keys assigned to the users of the email system and to the email data. In one embodiment the unique message identification key and mailbox identification key are hashed and utilized as an index into a selected database file. In addition, the unique user identification key may be hashed and used as an index to determine a database file containing data corresponding to the user. Hashing algorithms and hashing techniques are well known in the art and do not require further explanation.

In one embodiment of the present invention the deadlock analysis module 210 determines the level of data locking based on the deadlock history information stored in the deadlock history database 315. Upon retrieving the data history information corresponding to the data locality of the user requested data, the deadlock analysis module 210 uses a predetermined deadlock threshold levels to determine the level of locking. In one example if the number of deadlocks for a particular data locality occurred during a predetermined time interval is greater than a number of the allowed deadlocks represented by a high deadlock threshold, the data will be locked more conservatively. If the number of deadlocks for a particular data locality during a predetermined time interval is less than the number of the allowed deadlocks, then a less conservative data locking approach may be used. For example, if the number of the allowed deadlocks is 6 deadlocks in 10 minutes, and the number of deadlocks which actually occurred in the last 10 minutes involving the data locality corresponding to the user-requested data (e.g. an email message in an inbox mailbox) is 7 deadlocks, the inbox mailbox containing the user-requested email message may be locked from access of other users to ensure data consistency. However, if the information retrieved from the deadlock history database 315 indicates that there were no deadlocks that occurred involving the requested email message in the last 10 minutes, only the user-requested email message may be locked from access by other users, thus allowing other users to access the mailbox containing the requested message, which is providing a higher level of data concurrency. The deadlock history database 315 may be updated upon an occurrence of a deadlock in the system.

In one embodiment of the present invention the data locking levels are database file locking level, database record locking level, database page locking level, database row locking level and database object locking level. It will be appreciated that the data locking levels are not limited to the ones listed above.

In one embodiment the data locking method is utilized when the user is attempting to perform a writing operation, examples of which may be removing an email message from a mailbox; adding a new mailbox; moving messages from one mailbox to another; changing a parameter, which is utilized to distribute users' data among database files, for example changing user's last name. The determination of the data locking level is performed dynamically upon the user specifying the data to be accessed.

It will be appreciated that the above described method and apparatus are not limited to email systems and may be utilized with any data that may be represented by a unique identification keys. For example, the above described method and apparatus may be utilized in databases including electronic pager or instant message data, digitally stored video or image information, etc.

It will also be appreciated that the present invention is not limited to traditional client-server systems and may be implemented in other environments, such as peer-to-peer systems or in non-network environments.

In addition, it will be recognized that many of the features and techniques described above may be implemented in software. For example, the described operations may be carried out in the server 120 or other suitable device in response to its processor(s) executing sequences of instructions contained in memory of the device. The instructions may be executed from a memory such as TAM 73 and may be loaded from a persistent store, such as a mass storage device, and/or from one or more other remote processing systems. Likewise, hardwired circuitry may be used in place of software, or in combination with software, to implement the features descried herein. Thus, the present invention is not limited to any specific combination of hardware circuitry and software, nor to any particular source of software executed by the processing systems.

Thus, a method and apparatus for improving database concurrency have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method for improving database concurrency comprising:

receiving a request to access data;

determining a data locality within a database utilizing unique data keys;

determining a data locking level based on a deadlock history corresponding to the data locality; and providing access to the data while locking part of the database based on the data locking level.

2. The method of claim 1 wherein the database comprises a plurality of data localities.

3. The method of claim 1 wherein the deadlock history comprises a number of deadlocks in a predetermined period of time corresponding to each data locality from a plurality of data localities within the database.

4. The method of claim 1 wherein the deadlock history comprises a number of successful data accesses without a deadlock in a predetermined period of time corresponding to each data locality from a plurality of data localities within the database.

5. The method of claim 1 wherein the data locality is a database object.

6. The method of claim 1 wherein the data locality is a database page.

7. The method of claim 1 wherein the data locality is a database file.

8. The method of claim 1 wherein the determining the data locking level comprises determining the data locking level utilizing the deadlock history and predetermined deadlock thresholds.

9. The method of claim 8 wherein the determining the data locking level further comprises comparing the deadlock history to the predetermined deadlock thresholds.

10. The method of claim 1 wherein the unique data keys comprise user identification keys.

11. The method of claim 1 wherein the unique data keys comprise mailbox identification keys.

12. The method of claim 1 wherein the unique data keys comprise email message identification keys.

13. The method of claim 1 wherein the receiving the request to access data comprises receiving the request to access data from a client.

14. The method of claim 1 wherein the database is located on a server.

15. A method for improving database concurrency comprising:

assigning a first unique key to a user of an email system located on a server;

assigning a second unique key to a mailbox of a plurality of mailboxes corresponding to the user;

assigning a third unique key to an email message of a plurality of email messages corresponding to the mailbox;

receiving a request to access data from the user;

determining a data locality of user requested data utilizing the unique identification keys;

comparing a deadlock history corresponding to the data locality to a plurality of deadlock threshold levels;

determining a data locking level based on a result of the comparing; and locking the database based on the data locking level.

16. The method of claim 15 wherein the deadlock history comprises a number of deadlocks occurred in a predetermined period of time, the deadlocks corresponding to each data locality from a plurality of data localities within the database.

17. The method of claim 15 wherein the deadlock history comprises a number of successful data accesses without a deadlock occurred in a predetermined period of time, the successful data accesses corresponding to each data locality from a plurality of data localities within the database.

18. The method of claim 17 further comprising locking the database when deadlock history represents a number of deadlocks that occurred in a predetermined period of time greater than the maximum allowed number of deadlocks.

19. The method of claim 15 wherein the plurality of deadlock threshold levels comprise a maximum allowed number of deadlocks in a predetermined period of time.

20. The method of claim 15 wherein the determining the data locality comprises utilizing a hashing algorithm to determine the data locality.

21. A method for improving database concurrency comprising:

assigning a first unique key to a user of a data system located on a server;

assigning a second unique key to a mailbox of a plurality of mailboxes corresponding to the user;

assigning a third unique key to an email message of a plurality of email messages corresponding to the mailbox;

receiving a request to access data from the user;

determining a data locality of user requested data utilizing the unique identification keys;

comparing a deadlock history corresponding to the data locality to a plurality of deadlock threshold levels;

determining a data locking level based on a result of the comparing; and locking the database based on the data locking level.

22. The method of claim 21 wherein the data system is an email system.

23. The method of claim 21 wherein the deadlock history comprises a number of deadlocks occurred in a predetermined period of time, the deadlocks corresponding to each data locality from a plurality of data localities within the database.

24. The method of claim 23 further comprising locking the database when deadlock history represents a number of deadlocks that occurred in a predetermined period of time greater than the maximum allowed number of deadlocks.

25. The method of claim 21 wherein the deadlock history comprises a number of successful data accesses without a deadlock occurred in a predetermined period of time, the successful data accesses corresponding to each data locality from a plurality of data localities within the database.

26. The method of claim 21 wherein the the plurality of deadlock threshold levels comprise a maximum allowed number of deadlocks in a predetermined period of time.

27. The method of claim 21 wherein the determining the data locality comprises utilizing a hashing algorithm to determine the data locality.

28. An apparatus for improving database concurrency comprising:

a data locator to determine a user-requested data locality within a database utilizing unique data keys; and a deadlock analysis module to determine a data locking level by comparing a number of deadlocks corresponding to the data locality that occurred in a predetermined period of time to a deadlock threshold level and to lock the database based on the data locking level.

29. The apparatus of claim 28 wherein the database comprises a plurality of data localities.

30. The apparatus of claim 28 wherein the deadlock threshold level represents a maximum allowed number of deadlocks within the predetermined period of time.

31. The apparatus of claim 28 wherein the data locality is a database object.

32. The apparatus of claim 28 wherein the data locality is a database page.

33. The apparatus of claim 28 wherein the data locality is a database file.

34. The apparatus of claim 28 wherein the deadlock analysis module further configured to lock the database if the number of deadlocks occurred in a predetermined period of time is greater than the deadlock threshold level.

35. An apparatus for improving database concurrency comprising:

means for receiving a request to access data;

means for determining a data locality within a database utilizing unique data keys;

means for determining a data locking level based on a deadlock history corresponding to the data locality; and means for providing access to the data while locking part of the database based on the data locking level.

36. The apparatus of claim 35 wherein the database comprises a plurality of data localities.

37. The apparatus of claim 35 wherein the deadlock history comprises a number of deadlocks in a predetermined period of time corresponding to each data locality from a plurality of data localities within the database.

38. The apparatus of claim 35 wherein the deadlock history comprises a number of successful data accesses without a deadlock in a predetermined period of time corresponding to each data locality from a plurality of data localities within the database.

39. The apparatus of claim 35 wherein the data locality is a database object.

40. The apparatus of claim 35 wherein the data locality is a database page.

41. The apparatus of claim 35 wherein the data locality is a database file.

42. The apparatus of claim 35 wherein the means for determining the data locking level comprise means for determining the data locking level utilizing the deadlock history and predetermined deadlock thresholds.

43. The apparatus of claim 42 wherein the means for determining the data locking level further comprise the means for comparing the deadlock history to the predetermined deadlock thresholds.

44. A processing system comprising:

a storage medium having stored therein instructions which, when executed by a processor, cause the processing system to perform a method comprising:

receiving a request to access data;

determining a data locality within a database utilizing unique data keys;

determining a data locking level based on a deadlock history corresponding to the data locality; and providing access to the data while locking part of the database based on the data locking level.

45. The method of claim 44 wherein the database comprises a plurality of data localities.

46. The method of claim 44 wherein the deadlock history comprises a number of deadlocks in a predetermined period of time corresponding to each data locality from a plurality of data localities within the database.

47. The method of claim 44 wherein the deadlock history comprises a number of successful data accesses without a deadlock in a predetermined period of time corresponding to each data locality from a plurality of data localities within the database.

48. The method of claim 44 wherein the data locality is a database object.

49. The method of claim 44 wherein the determining the data locking level comprises determining the data locking level utilizing the deadlock history and predetermined deadlock thresholds.

50. The method of claim 49 wherein the determining the data locking level further comprises comparing the deadlock history to the predetermined deadlock thresholds.

51. The method of claim 44 wherein the unique data keys comprise user identification keys.

* * * * *